(12) United States Patent
Sudmalis et al.

(10) Patent No.: US 8,973,490 B2
(45) Date of Patent: Mar. 10, 2015

(54) COOKING APPARATUS WITH DETACHABLE SUPPORT AND METHOD FOR USING THE SAME

(75) Inventors: Roland Sudmalis, Park Ridge, IL (US); James C. Hand, Glen Ellyn, IL (US); Brian Saarnio, Aurora, IL (US); Jill Zmrhal, Plainfield, IL (US); Nigel Wang, Taipei (TW)

(73) Assignee: Columbia Insurance Company, Omaha, NE (US)

( * ) Notice: Subject to any disclaimer, the term of this patent is extended or adjusted under 35 U.S.C. 154(b) by 213 days.

(21) Appl. No.: 13/434,260

(22) Filed: Mar. 29, 2012

(65) Prior Publication Data

US 2013/0216691 A1    Aug. 22, 2013

Related U.S. Application Data

(63) Continuation-in-part of application No. 13/398,025, filed on Feb. 16, 2012, now abandoned.

(51) Int. Cl.
*A47J 43/18* (2006.01)
*A23L 1/315* (2006.01)
*A23L 1/318* (2006.01)

(52) U.S. Cl.
USPC ............... 99/347; 99/345; 99/346; 426/442; 426/644

(58) Field of Classification Search
CPC ........... A23L 1/315; A23L 1/318; A47J 43/18
USPC .............................. 426/442, 644; 99/345–347
See application file for complete search history.

(56) References Cited

U.S. PATENT DOCUMENTS

| 5,301,602 | A |   | 4/1994  | Ryczek  |         |
|-----------|---|---|---------|---------|---------|
| 5,624,167 | A | * | 4/1997  | Katz    | 312/223.1 |
| 5,893,320 | A |   | 4/1999  | Demaree |         |
| 6,062,131 | A |   | 5/2000  | Holland |         |
| 6,119,585 | A |   | 9/2000  | Guidry  |         |
| 6,125,739 | A |   | 10/2000 | Jernigan |        |
| 6,349,632 | B1 |  | 2/2002  | Beck, Jr. |       |

(Continued)

FOREIGN PATENT DOCUMENTS

GB    2416984    2/2006

OTHER PUBLICATIONS

PCT International Search Report and Written Opinion dated May 27, 2013 for PCT Application No. PCT/US2013/026150.

*Primary Examiner* — Jianying Atkisson
(74) *Attorney, Agent, or Firm* — Neal, Gerber & Eisenberg, LLP

(57) ABSTRACT

A cooking apparatus including a pan and a detachable support and a method for using the same to cook and flavor food are provided. The pan includes a bottom and a plurality of perforations arranged therein. The detachable cylinder includes a bottom surface, a generally circular sidewall extending upward from the bottom surface, and a plurality of fasteners formed on the bottom surface. The plurality of fasteners are sized and arranged to correspond with a sizing and arrangement of a subset of the perforations. The detachable cylinder is optionally secured to the pan by coupling the fasteners to the subset of perforations and by rotating the detachable cylinder in a first direction to move the fasteners into a locked position. The detachable cylinder is optionally disengaged from the pan by rotating the detachable cylinder in a second direction to move the fasteners into an unlocked position.

15 Claims, 4 Drawing Sheets

(56) References Cited

U.S. PATENT DOCUMENTS

| | | |
|---|---|---|
| 6,460,452 B1 | 10/2002 | Hester |
| 6,467,399 B1 | 10/2002 | Boutte |
| 6,502,501 B1 | 1/2003 | Simon |
| 6,557,460 B2 | 5/2003 | Hester |
| 6,622,616 B1 * | 9/2003 | Measom ......................... 99/345 |
| 7,879,381 B2 | 2/2011 | Dow |
| 2004/0187699 A1 | 9/2004 | Citrynell |
| 2012/0174799 A1 * | 7/2012 | Borovicka et al. .............. 99/347 |

* cited by examiner

COOKING APPARATUS WITH DETACHABLE SUPPORT AND METHOD FOR USING THE SAME

CROSS-REFERENCE TO RELATED APPLICATION

This application is a continuation-in-part application of U.S. patent application Ser. No. 13/398,025 filed on Feb. 16, 2012, entitled "Cooking Apparatus with Detachable Support and Method for Using the Same," which is incorporated herein by reference in its entirety.

BACKGROUND OF THE INVENTION

The invention disclosed herein generally relates to an apparatus and method for cooking food.

A popular technique for roasting chicken over a barbeque grill involves placing the back of the chicken onto an open beverage can that is sitting on top of a conventional pan. While the chicken is cooking on the grill, a flavored liquid inside the beverage can heats up and vaporizes. Vapor and steam exiting the beverage can then enter the body cavity of the chicken and are infused into the meat surrounding the body cavity. As a result, the roasted chicken meat is said to be tender and imparted with the flavor of the liquid inside the beverage can. Different flavors may be infused into the chicken by selecting different types of beverage cans or using a container that is filled with a flavored liquid, such as, for example, a home-made recipe.

The conventional chicken roasting technique described above can be messy and precarious. There is a risk that the upright chicken will topple over, especially in situations where the beverage can is simply sitting on top of a pan. And while on the grill, the chicken and the pan become very hot and difficult to handle. Additionally, as the chicken is roasting, drippings tend to collect on the pan and in and around the can or container inserted into the chicken's body cavity, making the clean up process especially unpleasant.

SUMMARY OF THE INVENTION

A cooking apparatus including a pan and a detachable support and a method for using the same to cook and flavor food are described herein. In one embodiment, the pan includes a bottom and a plurality of perforations arranged in said bottom. The detachable cylinder includes a bottom surface, a generally circular sidewall extending upward from said bottom surface, and a plurality of fasteners formed on the bottom surface. The plurality of fasteners are sized and arranged on the bottom surface to correspond with a sizing and arrangement of a subset of the perforations in the bottom of the pan. The detachable cylinder is optionally secured to the pan by coupling the plurality of fasteners to the subset of the perforations and by rotating the detachable cylinder in a first direction to move the plurality of fasteners into a locked position. The detachable cylinder is optionally disengaged from the pan by rotating the detachable cylinder in a second direction to move the plurality of fasteners into an unlocked position and by uncoupling the plurality of fasteners from the subset of the perforations in the bottom of the pan. More details of the present invention are set forth below in connection with the detailed description of the embodiments.

DETAILED DESCRIPTION OF THE DRAWINGS

Figure 1:
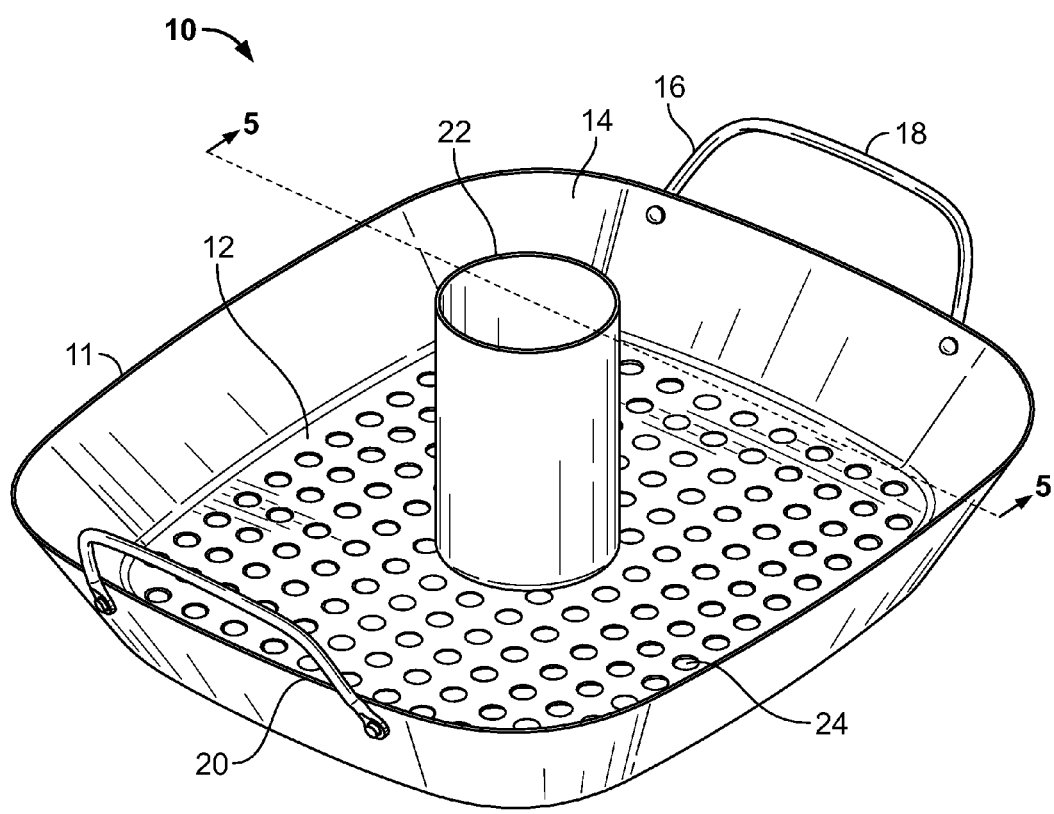
FIG. 1 is a top perspective view of an embodiment of the present invention showing a pan with a cylinder attached to the of the pan.

Referring now to the drawings, illustrated is a cooking apparatus 10 in accordance with the invention disclosed herein. It will be understood that the cooking apparatus 10, as shown in FIG. 1, is only exemplary, and that other apparatuses, having different configurations and/or appearances, can be used in accordance with the teachings disclosed herein.

In the exemplary embodiment of FIG. 1, cooking apparatus 10 is shown as including a pan 11 having a generally rectangular-shape with a bottom 12, outwardly-angled sides 14, and a pair of opposing handles 16. Top portions 18 of the handles 16 are generally parallel to top edges 20 of the sides 14. The handles 16 are shaped and sized to provide secure handling, even when gripped with oven mitts or pot holders. For example, the distance between the top portions 18 of the handles 16 and the top edges 20 of the sides 14 is large enough to receive bulky oven mitts or pot holders that are conventionally used to handle hot pans.

Figure 3:
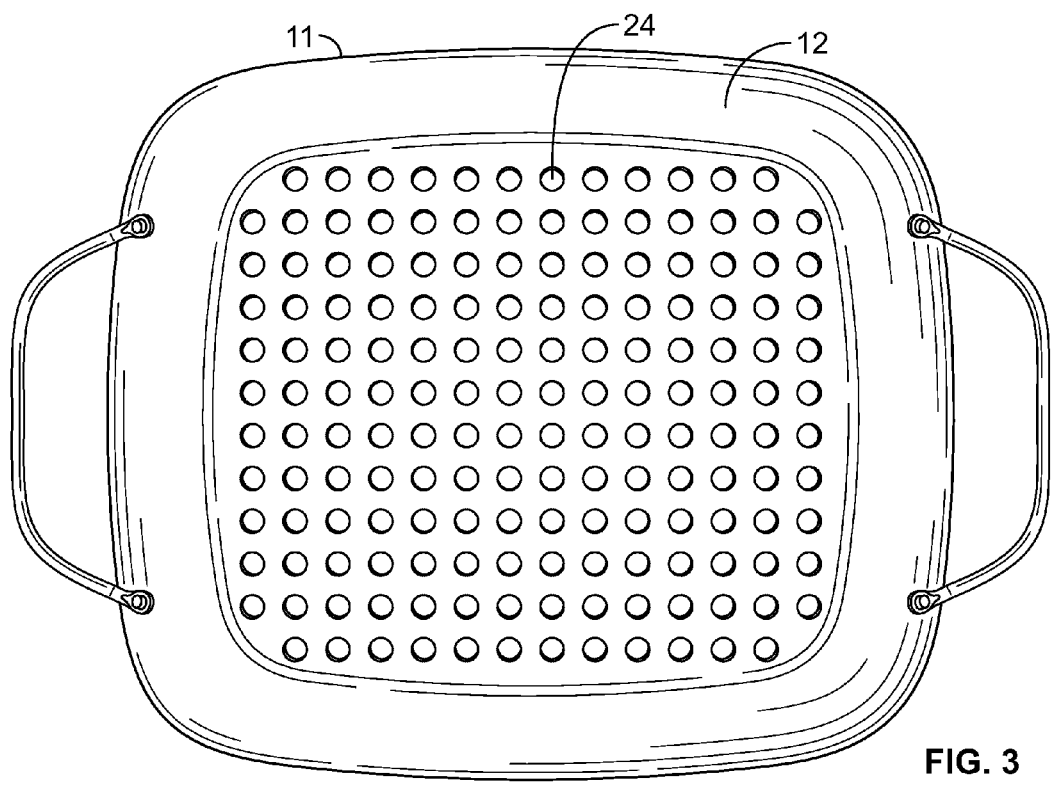
FIG. 3 is a bottom plan view of the pan in the embodiment depicted in FIG. 1.

The cooking apparatus 10 further includes a detachable cylinder 22 for supporting food, including, but not limited to, poultry or fowl, other meats, and vegetables, and for holding a flavored substance, e.g., a liquid, during the cooking process. For example, to support a fowl, such as a chicken, the detachable cylinder 22 may be inserted into the body cavity of the chicken from the backside of the chicken. As shown in FIGS. 1 and 3, the bottom 12 of the cooking apparatus 10 includes a plurality of perforations or holes 24 for optionally securing the detachable cylinder 22 to the bottom 12 and for allowing juices and other substances produced during the cooking process to flow down into, for example, a barbeque fire. As will be appreciated, the cooking apparatus 10 may also be used in a conventional oven by placing a baking dish or tray underneath the pan 11 to prevent any substances from flowing into the bottom of the oven.

Figure 2:
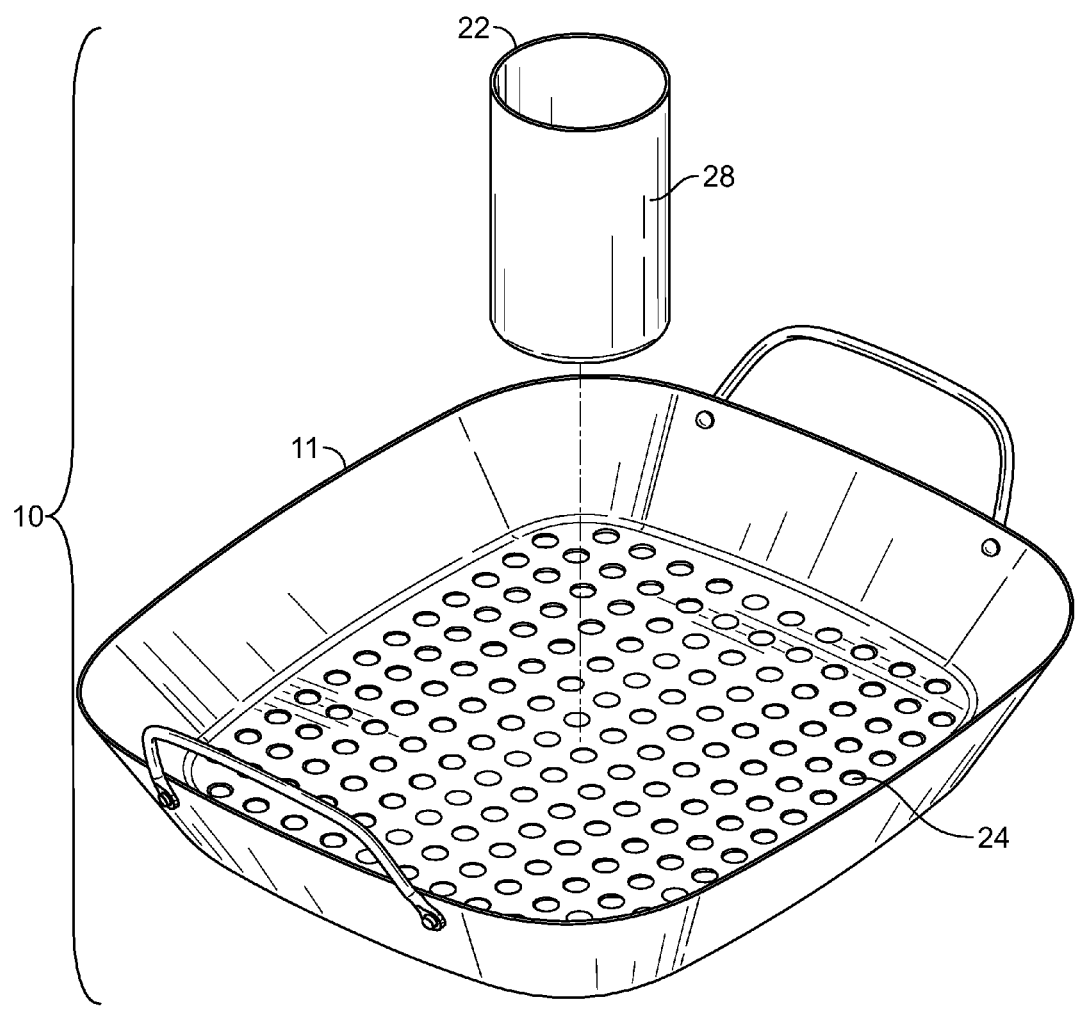
FIG. 2 is a top perspective view of the embodiment depicted in FIG. 1 with the cylinder detached from the pan.
Figure 4:
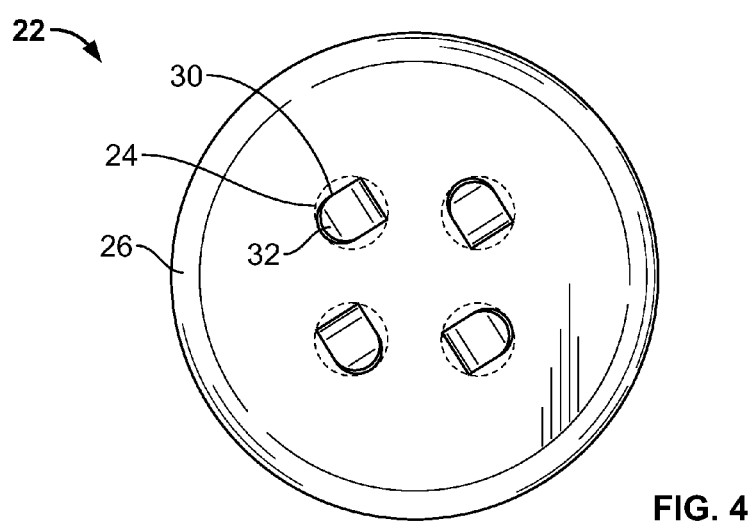
FIG. 4 is a bottom plan view of the cylinder in the embodiment depicted in FIG. 1.
Figure 5:
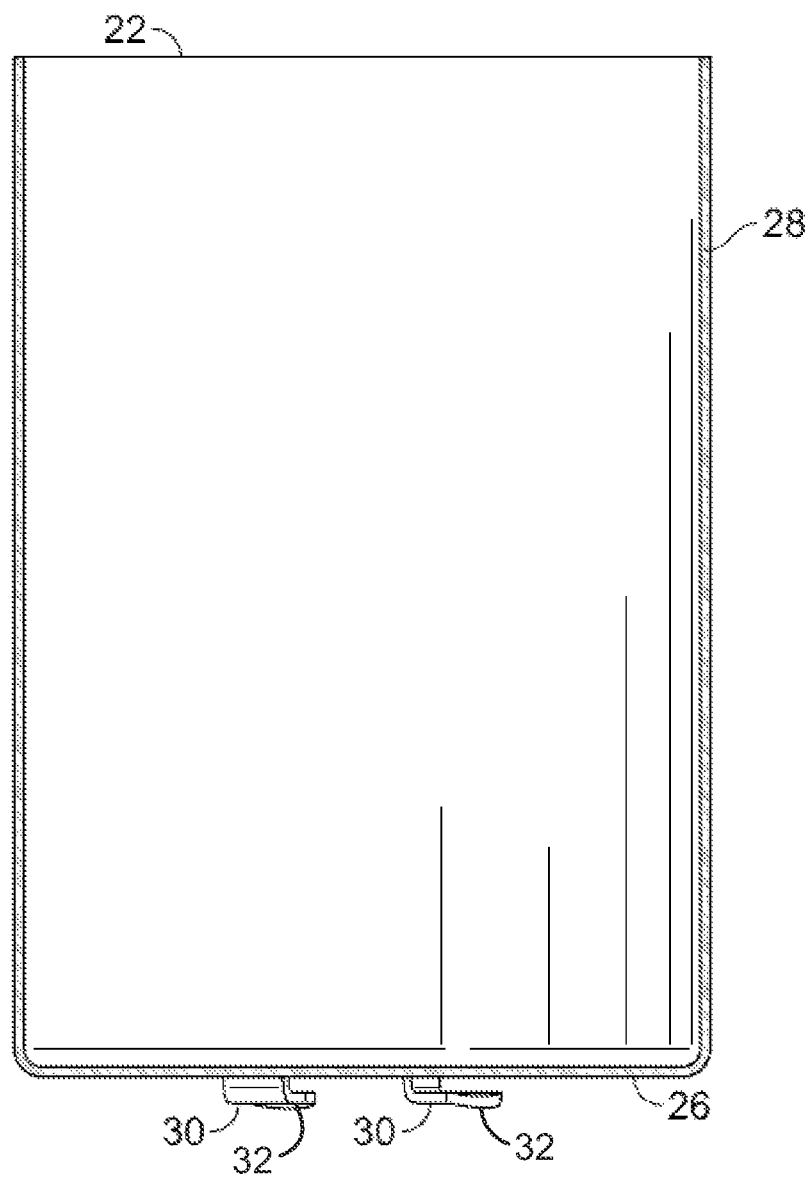
FIG. 5 is a cross-sectional view of the cylinder depicted in FIG. 1.

Referring now to FIGS. 2, 4 and 5, the detachable cylinder 22 includes a bottom surface 26, a generally circular sidewall 28 that extends upward from the bottom surface 26, and a plurality of fasteners 30 formed on the bottom surface 26. The detachable cylinder 22 is optionally attached to the bottom 12 of the pan 11 by inserting each of the fasteners 30 into a respective one of the holes 24 and by rotating the cylinder 22 in a first direction, so as to move the fasteners 30 into a locked position. The detachable cylinder 22 may be disengaged from the bottom 12 by rotating the cylinder 22 in a second direction, opposite from the first direction, so as to move the fasteners into an unlocked position, and by uncoupling the fasteners 30 from the holes 24. For example, the detachable cylinder 22 may be rotated clockwise to lock the fasteners 30 into the holes 24 and counterclockwise to unlock the fasteners 30 from the holes 24.

In one embodiment, fasteners 30 and holes 24 are spaced, sized, and shaped relative to each other, so that the plurality of fasteners 30 may be inserted into any corresponding subset of the plurality of holes 24. For example, as illustrated in FIG. 4 by the dotted lines representing a subset of the holes 24, the fasteners 30 may have a length and a width that are at least slightly smaller than a diameter of the holes 24, and may be spaced apart to correspond with the spacing between the holes 24. In the embodiment illustrated by FIG. 3, holes 24 are shown as forming a grid-like pattern, with the holes 24 being equally sized and equally spaced apart from each other. As a result, according in the illustrated embodiment, the four fasteners 30 of the detachable cylinder 22 may be coupled to any corresponding four-hole subset of the holes 24 in the bottom 12 of the pan 11.

FIG. 5 is a cross-sectional view of the detachable cylinder 22 showing two of the fasteners 30 extending from the bottom surface 26. In the illustrated embodiment, each fastener 30 is a protrusion that hangs below, but extends generally parallel to, the bottom surface 26, so as to have an open end 32 that is detached from the bottom surface 26. To facilitate the insertion of fasteners 30 into holes 24, the open ends 32 may have rounded corners. In one embodiment, the tip of each open end 32 is bent downward so as to hang slightly below the remaining portion of the fastener 30, thus further facilitating insertion of the fasteners 30 into holes 24.

As shown in FIG. 4, each of the fasteners 30 are positioned at a certain angle relative to a center line (not shown) extending, for example, horizontally through the center of the bottom surface 26. The angle at which the fasteners 30 are positioned may be selected based on manufacturing requirements and/or the arrangement of the holes 24 in the bottom 12 of the pan 11. In one embodiment, each fastener 30 is positioned so as to be at an angle of 58.5 degrees relative to the horizontal center line. Furthermore, the fasteners 30 are positioned so that the open end 32 of each fastener 30 faces the back of another fastener 30, going in a clockwise direction. The above-described positioning of the fasteners 30 allows detachable cylinder 22 to be moved into a locked, or unlocked, position with a single, simple rotation that requires little dexterity. As a result, the detachable cylinder 22 may be easily and quickly attached or detached even when wearing protective hand gear, such as, e.g., oven mitts or pot holders.

As will be appreciated, when the detachable cylinder 22 is coupled to the pan 11, fasteners 30 protrude through the holes 24 in the bottom 12 of the pan 11, so that the fasteners 30 are visible from the bottom side of cooking apparatus 10. In one embodiment, the bottom 12 of the pan 11 may be slightly convex at the center (not shown), so that when the cooking apparatus 10 is placed on a substantially flat surface, only the outer edges of the bottom 12 touch the surface. This convex center allows the fasteners 30 to protrude through the bottom 12 without touching the surface on which the cooking apparatus 10 is resting, thus eliminating the risk that the fasteners 30 will destabilize the cooking apparatus 10 by, for example, causing the cooking apparatus 10 to teeter when placed on a barbeque grill, a conventional oven rack, or the like.

As will be appreciated, holes 24 and fasteners 30 having other shapes, sizes, and/or spacings that are designed to optionally secure the fasteners 30 to the holes 24 can be used in accordance with the teachings disclosed herein. In addition, though the figures show four fasteners 30, it will be appreciated that any number of fasteners 30 sufficient to connect cylinder 22 to pan 11 may be included on the detachable cylinder 22 in accordance with the teachings disclosed herein.

To impart more flavor into the food being cooked, the detachable cylinder 22 may be filled with a flavored substance of choice, such as, e.g., beer, wine, soda, or a home-made solution, and during the cooking process, vapors from the heated substance may exit the cylinder 22 and may be infused into the food. Also during the cooking process, juices and other drippings from the food may flow into and around the cylinder 22, creating a fairly large and unpleasant mess. In one embodiment, the detachable cylinder 22 is sized and shaped to fit an aluminum can, such as a standard beverage can, that can be filled with any flavored substance and discarded after cooking is completed. Since the aluminum can may collect most of the drippings during cooking, being able to discard the aluminum can after completion of the cooking process can largely reduce the mess created inside the detachable cylinder 22, thereby minimizing post-cooking clean-up. In one embodiment, a diameter of the cylinder 22 may be slightly larger than the standard beverage can, and a height of the cylinder 22 may be slightly taller than the standard beverage can. In one embodiment, the cooking apparatus 10 includes a plurality of disposable detachable cylinders 22 that may be disposed at the completion of the cooking process, thereby further simplifying the clean-up process.

In one embodiment, the detachable cylinder 22 may be sized and shaped to fit the body cavity of an average-sized chicken. As another alternative, the cooking apparatus 10 may include a plurality of detachable cylinders 22 having different sizes and shapes to fit different types of food. For example, there may be a smaller cylinder for fitting inside the body cavity of a smaller fowl, such as, e.g., quail, and a larger cylinder for fitting inside the body cavity of a larger fowl, such as, e.g., turkey. As will be appreciated, any sized or shaped detachable cylinder 22 and pan 11 can be used, so long as the detachable cylinder 22 may be attached to the pan 11 in accordance with the teachings disclosed herein.

In one embodiment, the cooking apparatus 10 may include more than one detachable cylinder 22, and more than one detachable cylinder 22 may be attached to the bottom 12 of the pan 11 during the cooking process. For example, two or more fowls may be roasted at once using the exemplary cooking apparatus 10. Since the holes 24 are equally spaced and sized throughout the bottom 12, the detachable cylinder 22 may be coupled to the bottom 12 at any of a number of possible locations where the fasteners 30 can be inserted into a corresponding subset of holes 24.

As will be appreciated, the invention described herein is not limited to an exact method for manufacturing the cooking apparatus 10. In one embodiment, the bottom 12 and the outwardly-angled sides 14 of the pan 11 are formed by deep-drawing an appropriately-sized sheet of metal that is suitable for applications involving high heat exposure, such as barbequing. In one embodiment, the holes 24 may be formed by making round perforations into the sheet of metal. The detachable cylinder 22 may be made from the same type of metal and using a similar technique as the pan 11. In some embodiments, the fasteners 30 may be integrally formed on the bottom surface 26 of the detachable cylinder 22 by partially punching out appropriate locations on the bottom surface 26 of the cylinder 22. In other embodiments, the bottom of the cylinder 22 may be modified so that a flavored liquid that is poured directly into the cylinder 22 does not leak out of the bottom. For example, a metal plate may be placed inside the cylinder 22 on top of the bottom surface 26 so as to make the cylinder 22 "leakproof." In an alternative embodiment, the fasteners 30 are separately manufactured metal tabs that are permanently attached, e.g., welded, to the outside of the bottom surface 26 of the cylinder 22, so that the bottom surface 26 does not have any openings through which liquid may leak out.

The following is an exemplary method of using the cooking apparatus 10 described herein to make, for example, the traditional roasted chicken dish described above. A user may secure the detachable cylinder 22 onto the pan 11 by coupling fasteners 30 to a corresponding subset of the holes 24 and rotating the cylinder 22 clockwise to lock the cylinder 22 into place, as described above. The user may add a flavored liquid to the detachable cylinder 22 by opening a standard beverage can, e.g., a soda can, discarding (or drinking) a small amount of the liquid, removing a top portion of the can using kitchen scissors or the like, and placing the open beverage can into the cylinder 22. In an alternative embodiment, the user may pour a flavored liquid directly into the detachable cylinder 22. The user may set the back end of the chicken over the cylinder 22 by inserting the cylinder 22 into the body cavity of the chicken. To cook the chicken, the cooking apparatus 10 may be placed onto a hot barbeque grill. Once the chicken is finished cooking, the user may lift the chicken off the cylinder 22. Without having to remove any protective hand gear, e.g., oven mitts, the user can remove the detachable cylinder 22 from the bottom 12 of the pan 11 with a quick, counterclockwise rotation of the cylinder 22, followed by lifting the cylinder 22 off the bottom 12 of the pan 11. The user can directly empty the contents of the cylinder 22, e.g., the beverage can and any drippings produced during cooking, into the nearest garbage can.

According to one embodiment, the pan 11 of cooking apparatus 10 can serve as a multi-purpose pan for the preparation and/or cooking of a variety of foods, independent from the detachable cylinder 22. This is because the fasteners 30 that couple the pan 11 to the cylinder 22 are located only on the detachable cylinder 22. As an example, the pan 11, without the detachable cylinder 22, may be used to cook vegetables, fish, and/or meats that cannot be held upright on the detachable cylinder 22.

As described herein, the present disclosure provides a simple, easy-to-clean, multi-purpose cooking apparatus 10 for cooking and flavoring food that can be effectively manipulated even when having limited dexterity.

While specific configurations of the invention have been described in detail, it will be appreciated by those skilled in the art that various modifications and alternatives to those details could be developed light of the overall teachings of this disclosure. The particular arrangements disclosed herein a meant to be illustrative only and not limited as to the scope of the invention which is to be given the full breadth of the appended claims and any equivalents thereof.

The invention claimed is:

1. An apparatus for cooking and flavoring food comprising:
   a pan having a bottom and a plurality of uniform perforations formed in and arranged across said bottom; and
   a detachable cylinder having a bottom surface, a generally circular sidewall extending upward from said bottom surface, and a plurality of fasteners formed on the bottom surface, each of the fasteners being equally-sized and shaped to fit into any one of the plurality of uniform perforations in the bottom of the pan, and the plurality of fasteners being arranged on the bottom surface to correspond with an arrangement of any one of a plurality of subsets of the uniform perforations in the bottom of the pan, each subset containing a preset number of the uniform perforations,
   wherein each of the plurality of subsets corresponds to a different location in the bottom of the pan for attaching the detachable cylinder to the pan,
   wherein the detachable cylinder is optionally secured to the pan at a given location by coupling the plurality of fasteners to the subset of the uniform perforations that corresponds to the given location and by rotating the detachable cylinder in a first direction to move the plurality of fasteners into a locked position, and
   wherein the detachable cylinder is optionally disengaged from the pan by rotating the detachable cylinder in a second direction to move the plurality of fasteners into an unlocked position and by uncoupling the plurality of fasteners from the corresponding subset of the uniform perforations in the bottom of the pan.

2. The apparatus of claim 1, wherein the food is a fowl, and the detachable cylinder is insertable into a body cavity of the fowl for supporting the fowl on the pan during cooking.

3. The apparatus of claim 1, wherein the detachable cylinder holds a flavored substance to be infused into the food during cooking.

4. The apparatus of claim 3, wherein the detachable cylinder is sized to fit a beverage can that contains the flavored substance.

5. The apparatus of claim 1, wherein the first direction is opposite from the second direction.

6. The apparatus of claim 1, wherein the first direction is a clockwise direction and the second direction is a counterclockwise direction.

7. The apparatus of claim 1, wherein the preset number of perforations in each subset is equal to four, and the plurality of fasteners includes four fasteners.

8. The apparatus of claim 7, wherein each fastener includes a back end extending substantially perpendicular to the bottom surface and an open end extending substantially parallel to the bottom surface, the plurality of fasteners being arranged on the bottom surface such that the open end of each fastener faces the back end of a neighboring fastener.

9. The apparatus of claim 8, wherein the first direction is opposite from the second direction.

10. The apparatus of claim 1, wherein the plurality of uniform perforations are arranged in a grid pattern across the bottom of the pan.

11. An apparatus for cooking and flavoring food comprising:
    a pan having a bottom and a plurality of perforations arranged in said bottom; and
    a detachable cylinder having a bottom surface, a generally circular sidewall extending upward from said bottom surface, and a plurality of fasteners formed on the bottom surface, the plurality of fasteners being sized and arranged on the bottom surface to correspond with a sizing and arrangement of a subset of the perforations in the bottom of the pan,
    wherein each fastener includes a back end extending substantially perpendicular to the bottom surface and an open end extending substantially parallel to the bottom surface, the plurality of fasteners being arranged on the bottom surface such that the open end of each fastener faces the back end of a neighboring fastener,
    wherein the detachable cylinder is optionally secured to the pan by coupling the plurality of fasteners to the subset of the perforations and by rotating the detachable cylinder in a first direction to move the plurality of fasteners into a locked position, and
    wherein the detachable cylinder is optionally disengaged from the pan by rotating the detachable cylinder in a second direction to move the plurality of fasteners into an unlocked position and by uncoupling the plurality of fasteners from the subset of the perforations in the bottom of the pan.

12. The apparatus of claim 11, wherein the detachable cylinder is sized to fit a beverage can that contains a flavored substance.

13. The apparatus of claim 11, wherein the first direction is opposite from the second direction.

14. The apparatus of claim 11, wherein the subset of the perforations includes four perforations, and the plurality of fasteners includes four fasteners.

15. The apparatus of claim 11, wherein the plurality of perforations are arranged in a grid pattern across the bottom of the pan.

* * * * *